US006851587B1

(12) United States Patent
Tseng

(10) Patent No.: US 6,851,587 B1
(45) Date of Patent: Feb. 8, 2005

(54) CRUCIBLE AND SPINDLE FOR A VARIABLE SIZE DROP DEPOSITION SYSTEM

(75) Inventor: Ampere A. Tseng, Phoenix, AZ (US)

(73) Assignee: Arizona Board of Regents, Tempe, AZ (US)

( * ) Notice: Subject to any disclaimer, the term of this patent is extended or adjusted under 35 U.S.C. 154(b) by 0 days.

(21) Appl. No.: 09/868,471

(22) PCT Filed: Nov. 16, 1999

(86) PCT No.: PCT/US99/26946

§ 371 (c)(1),
(2), (4) Date: Jun. 15, 2001

(87) PCT Pub. No.: WO01/36136

PCT Pub. Date: May 25, 2001

(51) Int. Cl.[7] .............................................. B22D 37/00
(52) U.S. Cl. ...................... 222/590; 222/591; 222/594; 164/46
(58) Field of Search ................................ 222/590, 591, 222/594; 164/46, 457

(56) References Cited

U.S. PATENT DOCUMENTS

| 5,061,454 | A | | 10/1991 | Birk ............................ 422/119 |
| 5,207,371 | A | | 5/1993 | Prinz et al. .................. 228/125 |
| 5,266,098 | A | | 11/1993 | Chun et al. .................... 75/335 |
| 5,286,573 | A | | 2/1994 | Prinz et al. .................. 428/457 |
| 5,301,415 | A | | 4/1994 | Prinz et al. .................... 29/458 |
| 5,301,863 | A | | 4/1994 | Prinz et al. .................... 228/33 |
| 5,598,200 | A | | 1/1997 | Gore ............................ 347/88 |
| 5,617,911 | A | | 4/1997 | Sterett et al. ............... 164/457 |
| 5,722,479 | A | * | 3/1998 | Oeftering ...................... 164/46 |
| 6,149,072 | A | * | 11/2000 | Tseng ............................ 239/87 |
| 6,216,765 | B1 | * | 4/2001 | Tseng et al. ................. 164/271 |
| 6,309,711 | B1 | * | 10/2001 | Tseng et al. ................. 427/474 |

FOREIGN PATENT DOCUMENTS

WO    WO 99/03630    * 1/1999

OTHER PUBLICATIONS

Rayleigh, "On the Instability of Jets," *Proceedings of the London Mathematical Society*, vol. 10, pp 4–13 (Nov. 14, 1878–1879).
A. Lightman et al., "Alternate Approaches to RP&M," Ch. 16, *Rapid Prototyping and Manufacturing*, (P.F. Jacobs, ed.), Society of Manufacturing Engineers, Dec. 1992.

(List continued on next page.)

*Primary Examiner*—Scott Kastler
(74) *Attorney, Agent, or Firm*—Baker Botts L.L.P.

(57) ABSTRACT

An apparatus for forming three-dimensional objects includes a crucible (1) for holding a molten material; a conically-shaped orifice (1a) having a fixed outlet diameter ($d_0$) at the bottom of the crucible through which a jet (50) of the molten material flows towards the substrate; and an oscillating mechanical member (5) for breaking the flow of molten material into the molten material drops (60). The oscillating mechanical member further includes a conically-shaped head (5a) for cooperating with the orifice (1a) and for varying the effective size of the orifice. The conically-shaped head includes a slanted radial portion (5c) and a tip portion (5b) extending through the orifice. The effective diameter ($d_{eff}$) of the jet is defined by the relationship $d_{eff} = [d_0^2 - (d_0 - \delta \tan \theta)^2]^{1/2}$, wherein $\delta$ represents the amount of the tip portion extending through the orifice, and $\theta$ represents a slant angle corresponding to the slanted radial portion of the conically-shaped head.

5 Claims, 3 Drawing Sheets

OTHER PUBLICATIONS

D. Harmon, "Drop Sizes from Low Speed Jets," *J. Franklin Inst.*, vol. 259, pp. 519–522, (Dec. 1955).

C.A. Chen et al., "Effects of Droplet Thermal State on Deposit Microstructure in Spray Forming," *Scripta Materials*, vol. 34, pp. 689–696, Dec. 1996.

J. Chun et al., "Thermal Modeling of Deposit Solidification in Uniform Droplet Spray Forming," *Proceedings of the 1996 NSF Design and Manufacturing Grantees Conference, Society of Manufacturing Engineers*, pp. 353–354, Dec. 1996.

* cited by examiner

CRUCIBLE AND SPINDLE FOR A VARIABLE SIZE DROP DEPOSITION SYSTEM

CROSS-REFERENCE TO RELATED APPLICATIONS

This application is a national phase application of International Application No. PCT/US99/26946, which was filed on Nov. 16, 1999 and which published in English on May 25, 2001.

STATEMENT REGARDING FEDERALLY SPONSORED RESEARCH OR DEVELOPMENT

The invention disclosed herein was funded by Grant No. DMI-9696062 awarded by the National Science Foundation.

FIELD OF THE INVENTION

The present invention relates to an apparatus for manufacturing a three-dimensional object. More specifically, the present invention relates to an improved crucible and spindle design for a drop deposition system.

BACKGROUND OF INVENTION

Manufacturing processes utilizing deposition techniques have been developed for rapid prototyping of three-dimensional parts and tooling. For example, in U.S. Pat. No.'s 5,301,863, 5,301,415, 5,207,371 and 5,286,573 to Prinz et al., conventional systems and methods are disclosed for manufacturing three-dimensional objects by forming using thermal spray or weld deposition techniques to deposit material layers on a work surface. See also U.S. Pat. No. 5,266,098 to Chun et al.

Drop generators have also been developed and applied to the rapid prototyping of three-dimensional objects. See P. F. Jacobs, *Rapid Prototyping and Manufacturing*, ch. 16 (Society of Manufacturing Engineers 1992). In a conventional drop generator of this type, molten metal is ejected as a uniform laminar liquid jet from a circular injector or nozzle located at the bottom of a heated reservoir. The liquid jet is then broken into a series of uniformly sized drops by using a fixed diameter injector and an applied oscillation force near the injector or nozzle orifice. The uniformly sized drops are then deposited in layers on a substrate surface where they solidify to form the desired three-dimensional metal product.

With such techniques, resulting metal products can be designed to have fine, equiaxed micro-structures without manufacturing defects such as porosity or alloy segregation. See C.-A. Chen, P. Acquaviva, J.-H. Chun and T. Ando, "Effects of Droplet Thermal State on Deposit Microstructure in Spray Forming," *Scripta Materiala*, vol. 34, pp. 689–696 (1996); J.-H. Chun and T. Ando, "Thermal Modeling of Deposit Solidification in Uniform Droplet Spray Forming," *Proceedings of the 1996 NSF Design and Manufacturing Grantees Conference*, pp. 353–354 (Society of Manufacturing Engineers 1996). Other conventional systems, such as disclosed by Sterrett et al. in U.S. Pat. No. 5,617,911, use electromagnetic fields to control the deposition of uniform size drops.

The manufacturing capabilities of conventional drop generators, however, remain limited by the relatively small range of possible drop sizes. Greater variability in the drop size is desired to allow more efficient rapid prototyping by allowing the mass flux to be set according to the outline geometry and desired internal micro-structure of the product at a given point. Despite the variability of external oscillation, the possible range of drop sizes from a conventional drop generator is limited by the fixed injector diameter, which is typically less than one millimeter.

SUMMARY OF THE INVENTION

Therefore, a principle object of the present invention is to provide an apparatus for manufacturing a three-dimensional object utilizing a continuously variable diameter liquid jet to create variable drop sizes.

Another object of the present invention is to provide an apparatus for manufacturing a three-dimensional object utilizing an improved crucible and spindle apparatus for creating variable diameter liquid jets from which variable diameter material drops are formed.

A crucible and spindle apparatus is provided that substantially overcomes the aforedescribed limitations and inadequacies of those used in conventional drop deposition systems. In accordance with a preferred embodiment of the present invention, the apparatus includes a crucible for holding a reservoir of molten material and a conically-shaped orifice having a fixed diameter disposed in the bottom of the crucible through which a jet of the molten material flows towards the substrate. An oscillating mechanical member having a conically-shaped head is provided for varying the effective size of the orifice and breaking the flow of molten material into the molten material drops. The conically-shaped head includes a slanted radial portion and a tip portion extending through the orifice, wherein the effective diameter $d_{eff}$ of the orifice and thus the jet is defined by the equation $d_{eff} = [d_0^2 - (d_0 - \delta \tan \theta)^2]^{1/2}$. As explained in detail below, $d_0$ represents the fixed diameter of the crucible orifice, $\delta$ represents the amount of the tip portion extending through the crucible orifice, and $\theta$ represents a slant angle corresponding to the slanted radial portion of the conically-shaped head.

Further objects, features and advantages of the invention will become apparent from the following detailed description taken in conjunction with the accompanying figures showing illustrative embodiments of the invention.

BRIEF DESCRIPTION OF THE DRAWINGS

For a complete understanding of the present invention and the advantages thereof, reference is now made to the following description taken in conjunction with the accompanying drawings in which like reference numbers indicate like features and wherein.

DETAILED DESCRIPTION OF THE INVENTION

Figure 1:
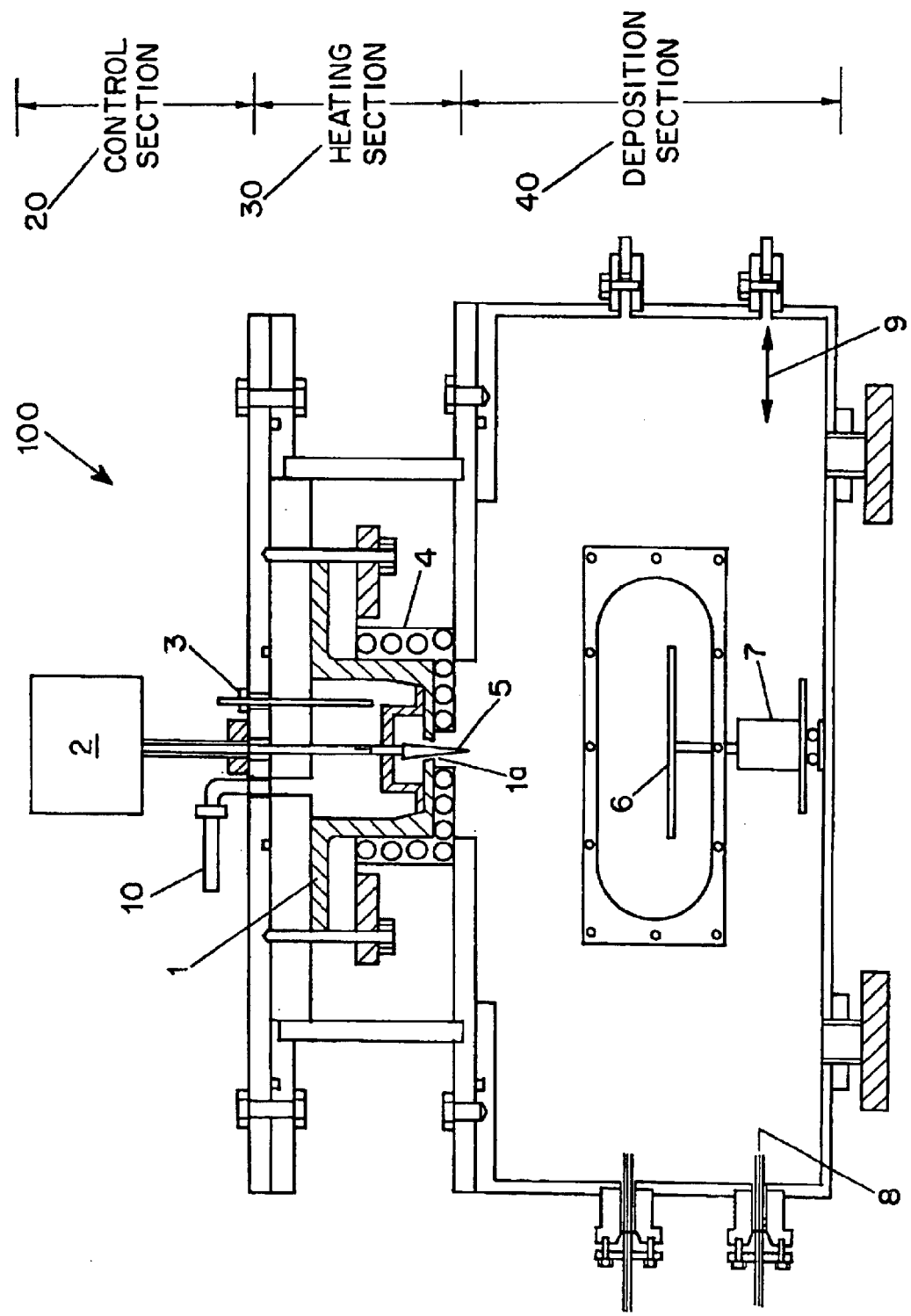
FIG. 1 is a sectional view of a drop deposition system for manufacturing a three-dimensional object which incorporates the present invention.

FIG. 1 illustrates a preferred embodiment of a drop deposition system 100 for manufacturing three-dimensional objects. The system is used to form variable size material drops from a variable size material jet, and is similar to the system described in co-pending U.S. application Ser. No. 09/010,923, which is hereby incorporated by reference in its entirety.

As shown in FIG. 1, the drop deposition system 100 includes a control section 20, a heating section 30 and a deposition section 40. The heating section 20 includes a crucible 1 for holding molten materials such as metals or wax deposited therein. The crucible 1 includes a fixed size orifice 1a, and is preferably provided with a corresponding heating device 4 for controlling the temperature of the molten material and a thermocouple 3 for monitoring the temperature of the molten material. An oscillating, position controlled spindle 5 is provided within the crucible 1 for agitating the molten material within the crucible 1. The spindle 5 thus causes a liquid jet to form as the material exits through the crucible orifice 1a, the jet in turn disintegrating into a cascading stream of material drops 60 as the material flows through the deposition section 40 and onto a traversable substrate 6 mounted with the deposition section 40.

Preferably, the spindle 5 is coupled to a piezoelectric oscillator (not shown) which vibrates the spindle 5 at a prescribed excitation frequency. Nominally, the oscillator and consequently the spindle is operated at an optimal excitation frequency $f_{opt}$ as defined by Equation 1 below:

$$f_{opt} = 0.225 \, U_j / d_{eff} \qquad \text{Equation (1)}$$

wherein $d_{eff}$ is the effective jet diameter and $U_j$ is the jet velocity. See, e.g., J. Rayleigh, "On the Stability of Jets," *Proceedings London Mathematical Society*," vol. 10, pp. 4–13 (1879); D. Harmon, "Drop Sizes from Low Speed Jets," *J. Franklin Inst.*, vol. 259, pp. 519–523 (1955). For most forming materials such as metal alloys or wax, e.g., a tin-antimony alloy or paraffin wax, $f_{opt}$ is nominally between 1 to 50 kHz.

Other features of the drop deposition system 100 include: a position controller 2 in the control section 20 coupled to the piezoelectric oscillator and spindle 5 for controlling the vertical position and excitation frequency of the spindle 5; a position controllable platform 7 for supporting and positioning the traversable substrate 6 on which the molten material drops 60 are deposited; sensor leads 8 for coupling sensors within the deposition section 40; and a vacuum/gas line 9 for controlling the pressure inside the deposition section 40. A connection 10 to an external pressure source, preferably a pressure source using non-reactive gases such as nitrogen or helium, is also provided for facilitating the flow of the molten metal from the crucible 1.

Figure 2:
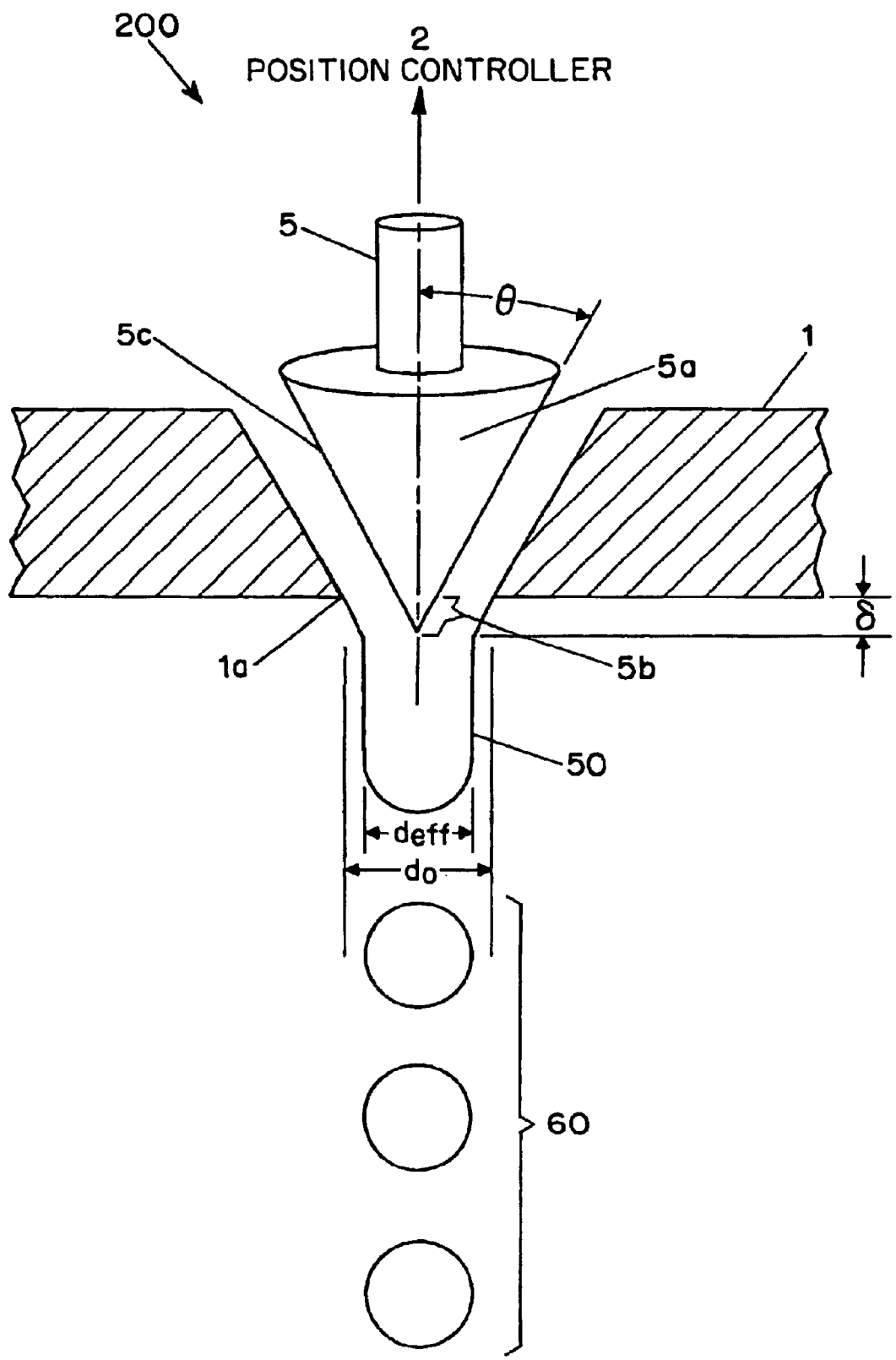
FIG. 2 is a sectional view of a conically-shaped orifice and corresponding conically-shaped spindle head in accordance with a preferred embodiment of the present invention.

Referring now to FIG. 2, which is detailed sectional view of the crucible orifice 1a and the spindle 5, the orifice 1a is conically-shaped having a fixed outlet diameter $d_0$. The spindle 5 includes a conically-shaped spindle head 5a for cooperating with the conically-shaped orifice 1a wherein the spindle head 5a itself includes a slanted radial portion 5c resembling an arrowhead defined by slant angle θ, and a tip portion 5b. The dimension 5, which is the amount the lowermost tip of the spindle extends below the bottom of the crucible 1, varies depending upon the vertical position of the spindle 5 and spindle head 5a. As such, by controlling the vertical position of the spindle 5 via position controller 2, the spindle 5 with its spindle head 5a also functions as a means for varying the effective diameter or size $d_{eff}$ of the crucible orifice 1a thereby varying the diameter or size of the liquid jet 50 expelled through the orifice 1a. The effective diameter $d_{eff}$ of the orifice 1a and thus liquid jet 50 the according to FIG. 2 is defined by Equation (2) below:

$$d_{eff} = [d_0^2 - (d_0 - \delta \tan \theta)^2]^{1/2} \qquad \text{Equation (2).}$$

Preferably, the slant angle δ value ranges from 5 to 30 degrees, and the fixed size diameter $d_0$ of the conically-shaped orifice ranges from 10 μm to 1 mm depending upon the accuracy requirements of the object to be manufactured.

Thus, the conically-shaped spindle head 5a is designed to cooperate with the conically-shaped orifice 1a so as to regulate the amount and flow rate of the molten material exiting the crucible 1 and to produce a wide range of droplet sizes. The conically-headed spindle 5 can be controlled or moved vertically to any number of positions which are determined by the position controller 2. Molten material flowing towards the crucible orifice 1a follows the contour of the conically-spaced spindle head 5a and thus forms a circular liquid jet 50 having a diameter $d_{eff}$ proportional to the amount of flow exited through the crucible orifice 1a. Since the spindle 5 is also subject to the excitation frequency discussed above, the circular jet 50 is then broken into cascading stream of droplets as the material flows towards the traversable substrate 6. As a result, a wide range of diameters of the circular jet and thus droplets are obtained.

Figure 3:
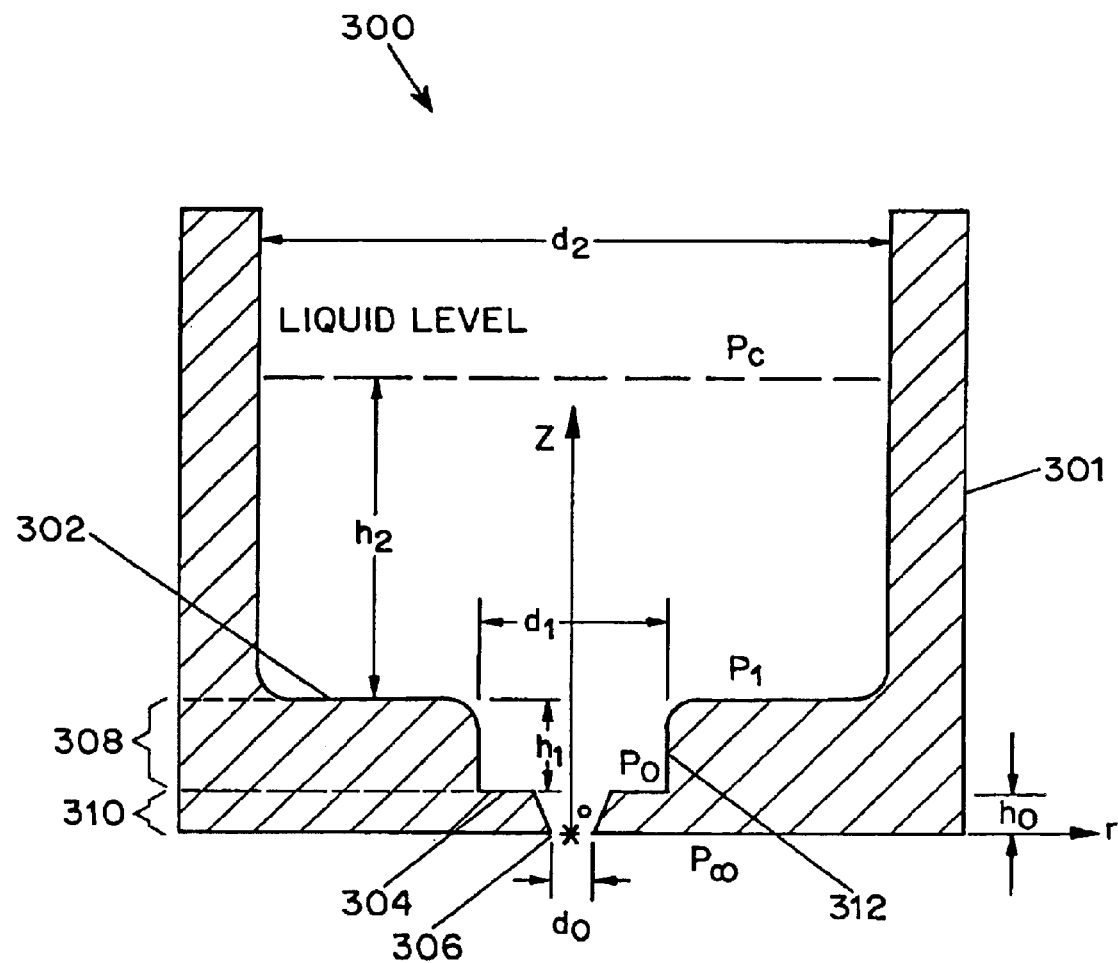
FIG. 3 is a sectional view of a crucible structure in accordance with a preferred embodiment of the present invention.

FIG. 3 shows a sectional view of a preferred embodiment of the crucible 1 shown in FIG. 1. The crucible 1, which is cylindrical in cross-section, has a vertical z-axis which passes through the center of the crucible orifice 306. Preferably, the crucible 1 is constructed of stainless steel coated with chromium or other similar materials capable of withstanding temperatures up to and exceeding 1000° C.

As shown in FIG. 3, the crucible 1 includes: the conically-shaped crucible orifice 306 having a fixed outlet diameter $d_0$; a first horizontal annular surface 304 extending radially from the z-axis of the crucible having an elevation 4 along the z-axis from the lower surface of the crucible with an inner contour defined by the diameter of the orifice and an outer contour defined by a first diameter $d_0$ greater than $d_0$; a second horizontal annular surface 302 extending radially from the z-axis of the crucible having an elevation $h_1 + h_0$ from the lower surface of the crucible with an inner contour defined by the first diameter $d_1$ and an outer contour defined by a second diameter $d_2$ greater than $d_1$; and an outer cylindrical wall 301 having an inner contour defined by the second diameter $d_2$.

FIG. 3 further shows the liquid level at an elevation $h_2 + h_1 + h_0$ and pressure values $P_C$, $P_1$, $P_0$ and $P_\infty$ at various points within the crucible with $P_C$ representing the pressure applied to the molten liquid at the elevation $h_2 + h_1 + h_0$ via an external pressure source, e.g., gas, $P_1$ representing the pressure of the liquid at the elevation $h_1 + h_0$, $P_0$ representing the pressure of the liquid at the elevation $h_0$, and $P_\infty$ represents the pressure of the liquid at the crucible orifice 306.

In summary, an improved crucible and spindle apparatus has been disclosed for use in a drop deposition system. The apparatus as disclosed herein is used to form variable diameter liquid jets from which variable diameter material drops 60 are formed.

Although the present invention has been described in connection with particular embodiments thereof, it is to be understood that such embodiments are susceptible of modification and variation without departing from the inventive concept disclosed. All such modifications and variations, therefore, are intended to be included within the spirit and scope of the appended claims.

What is claimed is:

1. A method for manufacturing a three-dimensional object by deposition of molten material in drops of varying size onto a substrate, wherein said method utilizes an apparatus comprising:

a crucible for holding a reservoir of molten material;

a conically-shaped orifice having a fixed outlet diameter disposed in the bottom of said crucible through which a jet of said molten material flows towards said substrate; and an oscillating mechanical member for breaking said flow of molten material into said molten material drops, said member having a conically-shaped head for cooperating with said orifice and for continuously varying the effective size of said orifice, said conically-shaped head comprising a slanted radial portion and a tip portion extending through the orifice, the effective diameter $d_{\mathit{eff}}$ of said orifice and said jet being defined by the equation $d_{\mathit{eff}}=[d_0^2-(d_0-\delta \tan \theta)^2]^{1/2}$, wherein $d_0$ is a variable representing said outlet diameter, $\delta$ represents the amount of said tip portion extending through the orifice, and $\theta$ represents a variable slant angle corresponding to said slanted radial portion; and wherein said method comprises:

(i) providing molten material in the crucible of the apparatus;

(ii) dispensing a Jet of said molten material through the conically shaped orifice of the apparatus;

(iii) varying the slant angle of the conically-shaped head of the oscillating member to form drops of molten material of varying size; and (iv) depositing said drops of molten material onto a substrate to produce a three-dimensional object.

2. The method of claim 1, wherein said crucible comprises:

a first annular surface extending radially from the center of the crucible having an elevation $h_0$ above the lower surface of said crucible, and an outer contour defined by a first diameter $d_1$ greater than $d_0$;

a second annular surface extending radially from the center of the crucible having an elevation $h_1+h_0$ above the lower surface of said crucible, an inner contour defined by the first diameter $d_1$, and an outer contour defined by a second diameter $d_2$ greater than $d_1$; and an outer cylindrical wall having an inner contour defined by the second diameter $d_2$.

3. The method of claim 1, wherein said oscillating mechanical member is coupled to a piezoelectric oscillator that oscillates at a frequency of $f_{opt}$ defined by the equation $f_{opt}=0.225\ U_j/d_{\mathit{eff}}$, wherein $d_{\mathit{eff}}$ is the effective diameter of said jet and $U_j$ is the velocity of said jet through said orifice.

4. The method of claim 1, wherein $\theta$ ranges between 5 and 30 degrees.

5. The method of claim 1, wherein $\theta$ ranges between 5 and 45 degrees.

* * * * *